United States Patent
Alvarado Chacon et al.

(10) Patent No.: US 10,003,057 B2
(45) Date of Patent: Jun. 19, 2018

(54) SEPARATOR PAPER FOR ELECTROCHEMICAL CELLS

(71) Applicant: TEIJIN ARAMID B.V., Arnhem (NL)

(72) Inventors: Fresia Alvarado Chacon, Utrecht (NL); Ramon Van Rooij, Eindhoven (NL); Richard Visser, Arnhem (NL); Jan David Tiecken, Didam (NL); Frank Diedering, Deventer (NL)

(73) Assignee: TEIJIN ARAMID B.V., Arnhem (NL)

( * ) Notice: Subject to any disclaimer, the term of this patent is extended or adjusted under 35 U.S.C. 154(b) by 0 days. days.

(21) Appl. No.: 14/917,112

(22) PCT Filed: Aug. 28, 2014

(86) PCT No.: PCT/EP2014/068227
§ 371 (c)(1),
(2) Date: Mar. 7, 2016

(87) PCT Pub. No.: WO2015/032678
PCT Pub. Date: Mar. 12, 2015

(65) Prior Publication Data
US 2016/0197325 A1 Jul. 7, 2016

(30) Foreign Application Priority Data
Sep. 6, 2013 (EP) ..................... 13183313

(51) Int. Cl.
*D21H 13/00* (2006.01)
*H01M 2/16* (2006.01)
(Continued)

(52) U.S. Cl.
CPC ............ *H01M 2/162* (2013.01); *D21H 13/26* (2013.01); *H01M 2/145* (2013.01); *H01M 10/0525* (2013.01); *H01B 3/52* (2013.01)

(58) Field of Classification Search
CPC .. H01M 2/162; H01M 2/145; H01M 10/0525; H01B 3/52; H01B 3/48;
(Continued)

(56) References Cited

U.S. PATENT DOCUMENTS

2003/0180622 A1 9/2003 Tsukuda et al.
2007/0167101 A1* 7/2007 Naruse .................. D21H 13/26
442/414
(Continued)

FOREIGN PATENT DOCUMENTS

EP 1 737 004 A1 12/2006
JP H10-292289 A 11/1998
(Continued)

OTHER PUBLICATIONS

Zhang et al (A highly safe and inflame retarding aramid lithium ion battery separator by papermaking process. Solid State Ionics 245-246 (2013) 49-55).*
(Continued)

*Primary Examiner* — Stephen J Yanchuk
(74) *Attorney, Agent, or Firm* — Oliff PLC

(57) ABSTRACT

A paper suitable for use as separator in an electrochemical cell, including at least 60 wt. % of an aramid fibril and at least 1 wt. % of an aramid fiber. The paper has a grammage of 5 to 100 g/m2, and the aramid fibril has a Canadian Standard Freeness (CSF) in a wet phase of less than 300 ml and a specific surface area (SSA) after drying of less than 3 m2/g. It has been found that a paper with this composition combines good electrolyte absorption and ion permeability with high stability during use, leading to a long lifetime for the electrochemical cell.

19 Claims, 1 Drawing Sheet

(51) Int. Cl.
  *D21H 13/26* (2006.01)
  *H01M 2/14* (2006.01)
  *H01M 10/0525* (2010.01)
  *H01B 3/52* (2006.01)

(58) Field of Classification Search
  CPC ......... H01H 13/26; D01F 6/605; D01F 14/04; Y02P 70/629; Y10T 442/2902; Y10T 442/2893; D21K 5/1236; D21H 11/18; D21H 13/00; D21H 13/48; D21H 13/50; D21H 13/52
  USPC .......................... 162/146, 138, 157.1–157.4
  See application file for complete search history.

(56) References Cited

U.S. PATENT DOCUMENTS

| | | | | |
|---|---|---|---|---|
| 2007/0287062 | A1* | 12/2007 | Tsukuda | H01G 9/02 429/129 |
| 2009/0101295 | A1* | 4/2009 | Merriman | D21H 13/20 162/28 |
| 2012/0164514 | A1* | 6/2012 | Hayakawa | H01M 2/145 429/144 |
| 2014/0141337 | A1* | 5/2014 | Morin | B01D 39/16 429/246 |

FOREIGN PATENT DOCUMENTS

| | | |
|---|---|---|
| JP | 2006-245550 A | 9/2006 |
| WO | 2004/099476 A1 | 11/2004 |
| WO | 2005/059211 A1 | 6/2005 |
| WO | 2008122374 A1 | 10/2008 |
| WO | 2012/162168 A1 | 11/2012 |

OTHER PUBLICATIONS

Feb. 19, 2015 International Search Report and Written Opinion issued in International Application No. PCT/EP2014/068227.

English translation of Jul. 25, 2017 Office Action issued in Japanese Patent Application No. 2016-539476.

* cited by examiner

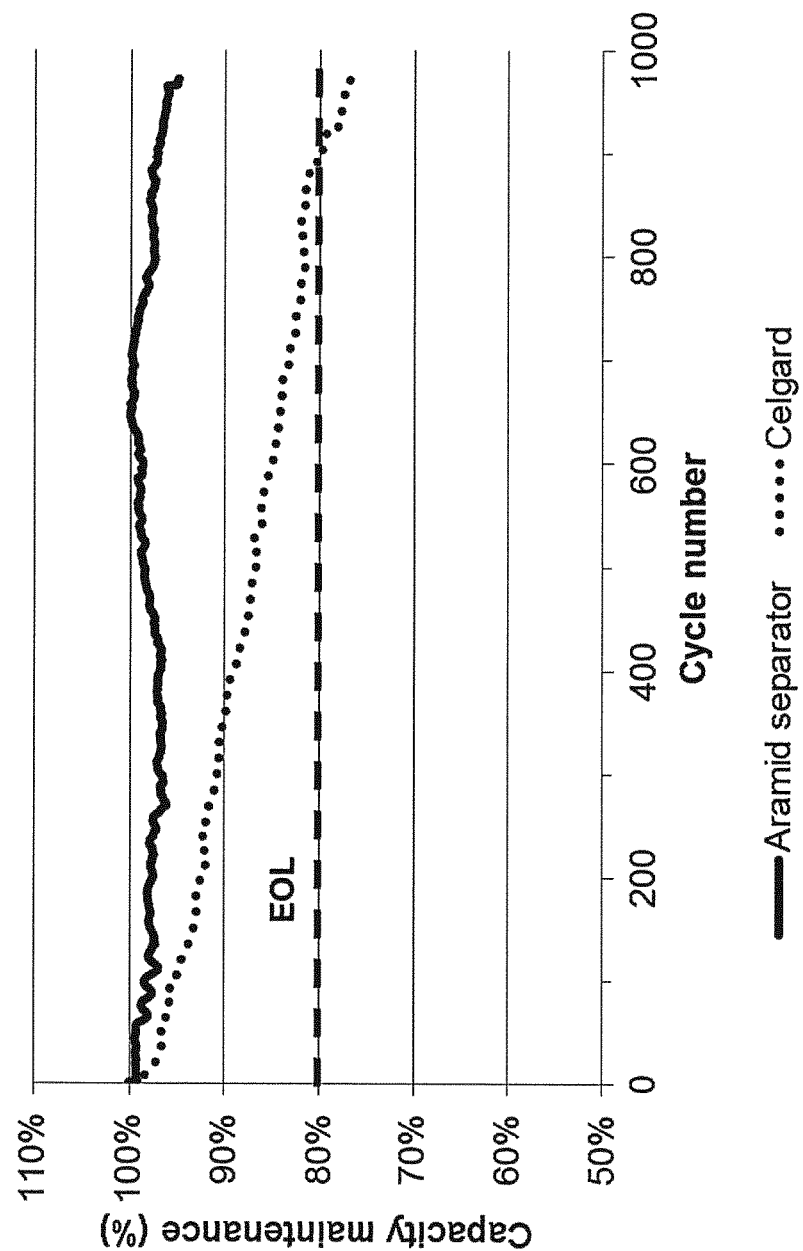

SEPARATOR PAPER FOR ELECTROCHEMICAL CELLS

The present invention pertains to a paper suitable as separator for electrochemical cells. The invention also pertains to a method for making the separator paper, to the use of the paper in electrochemical cells, and to electrochemical cells provided with a separator paper according to the invention.

In their broadest embodiment, electrochemical cells comprise a cathode, an anode, and electrolyte, wherein the cathode and anode are separated through the separator, which comprises the electrolyte. The purpose of the separator is on the one hand keeping the electrodes apart to prevent short-circuiting, while on the other hand allowing ionic charge to pass to complete the electrical circuit during the passage of current.

The lifetime of an electrochemical cell is dependent, in al., on the lifetime and stability of the separator. Therefore, the separator should be able to withstand degradation under the conditions prevailing in the cell during use. Additionally, the separator should be as thin as possible to give increased performance, without however compromising on stability. Stability to high temperatures is required to increase cell safety and stability.

Conventional separators, in particular for lithium ion batteries, are often polymer microporous membranes, typically polyolefin membranes based on polyethylene and/or polypropylene. In the field, work is being done to develop separators with improved properties. One way forward is the development of non-woven based on aramid. Aramid combines a high strength with high temperature resistance and therefore is an attractive material for many industrial applications. That it can be formulated into thin papers with good properties is an additional reason why it is attractive for separators.

US2007/0167101 describes a separator paper comprising aramid staple fiber, fibrillated aramid, and optionally aramid fibril.

US2003/0180622 describes a separator paper which comprises organic fibers fibrillated into a fiber diameter of 1 micron or less, and unfibrillated organic fibers having a fineness of 0.5 dtex or less.

EP1737004 describes a separator comprising 15-80 wt. % of fibrillated heat-resistant fiber, 5-35 wt. % of fibrillated cellulose, and 10-75 wt. % of non-fibrillated fiber. The fibrillated heat-resistant fiber preferably is para-aramid.

A problem with the aramid-based papers described in these references is that their stability during use is not sufficient enough. This results in an insufficient lifetime of the electrochemical cell. There is therefore need in the art for a paper suitable for use in separators which combines a good electrolyte adsorption and ion permeability with a high stability during use, leading to a long life-time for the electrochemical cell.

The present invention provides such a paper.

The present invention therefore pertains to a paper suitable for use as separator in electrochemical cells, which comprises at least 60 wt. % of aramid fibril and at least 1 wt. % of aramid fiber, the paper having a grammage of 5 to 100 g/m2, and the aramid fibril having a Canadian Standard Freeness (CSF) in the wet phase of less than 300 ml and a specific surface area (SSA) after drying of less than 3 m2/g.

It has been found that the use of a relatively high amount of aramid fibril having a Canadian Standard Freeness (CSF) in the wet phase of less than 300 ml, and a specific surface area (SSA) after drying of less than 3 m2/g makes for a paper with good properties, in particular a good stability under conditions of use.

In this context it should be noted that US2007/0167101 describes the use of fibrillated para-aramid, but indicates that it should have a specific surface area of at least 5 m2/g, because otherwise the binder function of the fibrillated aramid would be reduced. It has been found, however, that the use of fibrillated aramid with a specific surface area of more than 5 m2/g as proposed by US2007/0167101 shows a lower stability than the use of the fibrillated aramid specified for the present invention.

US2003/0180622 describes the use of highly fibrillated para-aramid, obtained by refining para-aramid fibers. Highly fibrillated para-aramid obtained in this manner has a surface area after drying which is well above 5 m2/g.

The invention will be discussed in more detail below.

The paper according to the invention comprises at least 60 wt. % of aramid fibril. If the amount of aramid fibril is too low, the properties of the separator paper will be insufficient. In particular the coverage of the paper will be insufficient, pinholes may appear that will lead to insufficient electrical insulation between the cathode and the anode, leading to short circuiting of the electrochemical cell. The maximum of the amount of aramid fibril is determined by the minimum amount of fiber, which will be discussed in more detail below. In one embodiment, the paper comprises at most 90 wt. % of aramid fibril, in particular at most 80 wt. % of aramid fibril. An amount of 62-80 wt. % of aramid fibril may be preferred to obtain a separator paper with good properties. The aramid fibril is in particular para-aramid fibril.

The fibril in the paper according to the invention has a Canadian Standard Freeness (CSF) of less than 300 ml. The CSF is a parameter often used in the art of pulp and paper technology. It is a measure of the drainability of a pulp suspension in water. CSF can be determined in accordance with TAPPI T227.

It may be preferred for the fibril used in the present invention to have a CSF of less than 200 ml, more specifically less than 150 ml. The lower limit for the CSF is not critical to the present invention. As a general value, a lower limit of 1 ml may be mentioned.

The aramid fibril used in the present invention has a specific surface area (SSA) after drying of at most 3 m2/g. The very low surface area after drying of the fibril used in the present invention, in combination with the CSF as discussed above, shows that the fibril has a very fine structure.

It may be preferred for the aramid fibril to have surface area after drying of less than 1.5 m2/g. The lower limit for the surface area after drying is not critical to the present invention. As a general value, a lower limit of at least 0.1 m2/g may be mentioned. Specific surface area (SSA) can determined using adsorption of nitrogen by the BET specific surface area method, using a Gemini 2375 manufactured by Micromeretics, with the fibrils being dried at 120° C. overnight, followed by flushing with nitrogen for at least 1 h at 200° C.

In one embodiment, the aramid fibril used according to the invention may have a weight weighted length for particles having a length above 250 micron (WL0.25) of less than 1.2 mm. This parameter means that of the particles having a length above 250 microns, the weight weighted average length of the particles is below 1.2 mm. This is again a measure for the fineness of the fibril. It may be preferred for the fibril to have a WL0.25 of less than 1.0 mm. As a minimum, a value of 250 microns may be mentioned. Fibril length measurement can be done using the Pulp ExpertT™FS (ex Metso). As length the average length (AL), the length weighted length (LL), weight weighted length (WL) is used.

Conventional aramid pulp is obtained by subjecting aramid fibers to one or more refining or fibrillating steps, which results in fibrillated pulp, comprising a fiber stem to which fibrils are attached. For this pulp, the surface area increases when the pulp is further refined to obtain smaller fibrils, with a CSF of less than 300 ml. Therefore, the fibrils used in the present invention, which have a relatively low surface area after drying are generally not obtained by fibrillating fibers, as the material obtained by this process will generally not have the claimed combination of properties.

Aramid fibril suitable for use in the present invention is described, e.g., in WO2005/059211 to Teijin Twaron, and can be obtained by the methods described therein. In this method, the fibrils are obtained directly from a polymer solution.

In one embodiment, the fibrils obtained by the process of this reference are subjected to shear forces, e.g., refining. Refining can be carried out to further decrease surface area after drying and the CSF.

Therefore, the aramid fibril used in the present invention, in particular para-aramid fibril, may be obtained by a process comprising the steps of polymerizing an aromatic diamine and an aromatic dicarboxylic acid halide to an aramid polymer, in a mixture of N-methylpyrrolidone or dimethylacetamide and calcium chloride or lithium chloride, to obtain a dope wherein the polymer is dissolved in the mixture and the polymer concentration is 2 to 6 wt. %, converting the dope to fibrils by using a jet spin nozzle under a gas stream, and coagulating the fibrils using a coagulation jet. Preferably, at least part of the hydrochloric acid formed during the polymerisation reaction is neutralized to obtain a neutralized dope. Preferably, the (relative viscosity) of the aramid polymer is between 2.0 and 5.0. In one embodiment the fibrils obtained by the process described above are subjected to shear forces, e.g., refining before they are incorporated into the paper of the invention.

The paper according to the invention comprises at least 1 wt. % of aramid fiber, more specifically at least 5 wt. %, in particular at least 10 wt. %. The amount of aramid fiber is at most 40 wt. %, in particular at most 38 wt. %, still more in particular at most 30 wt %. The aramid fiber can be meta-aramid, meta-para-aramid, or para-aramid. The use of meta-para-aramid or para-aramid fiber is considered preferred, because it will lead to a paper with good dimensional stability. The use of para-aramid fiber is considered particularly preferred. The combination of para-aramid fibril with para-aramid fibers delivers a separator that can withstand high temperatures during the cell making process. By using para-aramid the pore structure is not changed when subjected to high temperatures. Dimensional stability at high temperature and during electrolyte uptake make the material suitable in cell assembling and cell function.

The aramid fiber refers to aramid fibres cut to a number-average length which generally is in the range of 2-15 mm, in particular a length of 2-10 mm, more in particular 3-8 mm, more in particular 6 mm. The linear density is preferably less than 1.6 dtex, preferably less than 1.3 dtex, more in particular a linear density of less than 0.8 dtex. It has been found that a decrease in linear density leads to improved properties, in particular increased starting point of discharge capacity.

Other components may be present in the separator paper according to the invention, as long as their presence fits in with the weight percentages of aramid fibril and aramid fiber.

In view of the attractive properties associated with the use of meta-para-aramid and para-aramid in the separator paper according to the invention, it is preferred for the paper to comprise at least 70 wt. % of the total of meta-para aramid and para-aramid, in particular at least 80 wt. %, more in particular at least 90 wt. %, still more in particular at least 95 wt. %, even more in particular at least 98 wt. %.

It may be particularly preferred for the paper of the invention to comprise at least 60 wt. % of para-aramid, in particular at least 70 wt. % of para-aramid, more in particular at least 80 wt. %, still more in particular at least 90 wt. %, even more in particular at least 95 wt. %, or even at least 98 wt. %.

Unless specified otherwise, all weight percentages as described herein are based on the total dry weight of the paper.

The term "aramid" as used herein refers to an aromatic polyamide which is a condensation polymer of aromatic diamine and aromatic dicarboxylic acid halide. Aramids may exist in the meta-form, the para-form, and the meta-para form.

A meta-aramid is defined as an aramid wherein at least 85% of the bonds between the aromatic moieties are meta-aramid bonds. A para-aramid is defined as an aramid wherein at least 85% of the bonds between the aromatic moieties are para-aramid bonds. A meta-para-aramid is defined as an aramid wherein at least 16% of the bonds between the aromatic moieties are meta-aramid bonds and at least 16% of the bonds between the aromatic moieties are para-aramid bonds. An example of a meta-para aramid, i.e., a copolymer having meta- and para-bonds is copolyparaphenylene/3,4'-oxy-diphenylene terephthalamide (Technora®) which contains about 33% meta-bonds.

It is preferred for the para-aramid used in the present invention to have at least 90%, more in particular at least 95%, of the bonds between the aromatic moieties in the form of para-aramid bonds.

As examples of para-aramid may be mentioned poly (paraphenylene terephthalamide), poly(4,4'-benzanilide terephthalamide), poly(paraphenylene-4,4'-biphenylenedicarboxylic acid amide) and poly(paraphenylene-2,6-naphthalenedicarboxylic acid amide). The use of poly(paraphenylene terephthalamide), also indicated as PPTA, is particularly preferred.

If so desired, the paper can comprise one or more common papermaking components, such as fillers including mica, clay such as kaolin and bentonite, minerals, binders, fibers, tackifiers, adhesives, and the like. In one embodiment, the fillers, such as kaolin, may be introduced into the paper by way of aramid fibril and/or aramid fibrid, e.g., by using filler-containing fibrils or fibrids manufactured by incorporating filler into the fibril or fibrid during the manufacturing process, for instance as has been described in WO 2008/122374.

Typically, such components may be present in an amount not exceeding 25 wt. %. If these components are used, they are generally present in an amount of 2-25 wt. %. Depending on the compound, a range of 10-25 wt. % may be mentioned. On the other hand, papers containing less than 2 wt. % of additional components, or substantially no additional components, are also clearly envisaged.

The paper according to the invention has a grammage of 5 to most 100 g/m2, more specifically between 5 and 50 g/m2. The grammage should be as low as possible as can be achieved without detrimentally affecting the further properties of the separator paper, e.g., between 5 and 30 g/m2. In one embodiment, the separator paper has a grammage of 10 to 25 g/m2.

In one embodiment, the paper according to the invention has a thickness of at most 250 micron, preferably below 100 micron, most preferably below 40 micron. A minimum value of 5 micron may be mentioned.

In one embodiment the paper according to the invention has a Gurley of less than 200 seconds, more preferably less than 50 seconds. Gurley is a measure for the air permeability of the paper. It can be determined in accordance with TAPPI T460. It may be preferred for the Gurley to be less than 10 seconds.

In one embodiment the paper according to the invention has an average pore size or mean flow pore size of less than 12 micron. The average pore size should not be too high, as this will increase the risk of short-circuiting. The average pore size is measured via capillary flow porometry. Capillary flow porometry is based on the displacement of a wetting liquid inside a porous network by means of an inert gas flow. By using the measured wet and dry curve, the mean flow pore size is calculated in accordance with ASTM F 316-03. It may be preferred for the average pore size to be less than 10 micron. Mean flow pore sizes smaller than 100 nm are usually accompanied by high Gurley values which might make the paper unsuitable for the application. Therefore, the mean flow pore size preferably is between 0.1 and 10 micron.

The paper of the present invention typically has a tensile strength of at least 2 N/cm, in particular at least 4 N/cm, more in particular at least 5 N/cm. Tensile strength can be determined in accordance with ISO1924-2. If the tensile strength of the paper is insufficient, processing it into an electrochemical cell will be difficult.

In one embodiment, the paper of the present invention has a tear resistance of at least 60 mN. The tear resistance is a measure of how well a material can withstand the effect of tearing when an initial cut is present. This is a measure of the susceptibility of the paper to damage propagation. The tear resistance can be determined in accordance with ISO1974. It is preferred for the tear resistance to be at least 100 mN, in particular at least 130 mN.

The paper according to the invention may be manufactured by paper making methods known in the art. In one embodiment, the papers are manufactured by the following process. A suspension, generally an aqueous suspension, is prepared comprising the aramid fibril, aramid fiber, and optionally further components as described above. The suspension is applied onto a porous screen, so as to lay down a mat of randomly interwoven material onto the screen. Water is removed from this mat, e.g., by pressing and/or applying vacuum, followed by drying to make paper. If so desired, a calendaring step may be applied to increase the density of the paper. Calendering steps are known in the art. They generally involve passing the paper through a set of rolls, if so desired at increased temperature.

The present invention also pertains to the use of the paper above as separator in electrochemical cells. Examples of electrochemical cells wherein the paper according to the invention may be used are batteries, fuel cells, and supercapacitors. Use of the paper according to the invention in secondary batteries, specifically lithium ion batteries is particularly preferred, as this type of battery has been found to benefit in particular from the properties of the separator paper according to the invention.

The invention also pertains to an electrochemical cell comprising a cathode, an anode, and an electrolyte between the cathode and the anode, wherein the cathode and the anode are separated by a separator paper according to the invention.

The invention also pertains to an electrochemical cell which is a lithium ion battery comprising a cathode, an anode, and an electrolyte between the cathode and the anode, wherein the electrolyte comprises lithium salts, the cathode and the anode being separated by a separator paper according to the invention.

Lithium ion batteries are known in the art and require no further elucidation here. The anode generally comprises carbon, e.g., in the form of graphite. The cathode generally comprises a (mixed) metal oxide or (mixed) metal phosphate, e.g. in the form of a layered oxide such as lithium cobalt oxide, a mixed phosphate such as lithium iron phosphate, or a spinel, such as lithium manganese oxide.

The electrolytes are mostly nonaqueous solutions, e.g., comprising lithium salts dissolved in aprotic organic solvents, e.g. a mixture of carbonate solvents selected from cyclic carbonates (for example ethylene carbonate or propylene carbonate) and linear carbonates (dimethyl carbonate, ethyl methyl carbonate and diethyl carbonate).

It is noted that the embodiments of the paper described herein may be combined with each other in manners clear to the skilled person. This applies to all properties and compositions. All embodiments and properties described for the paper are also applicable to the method for manufacturing the paper, individually or in combination. All embodiments and properties described for the paper are also applicable to the use thereof as separator in electrochemical cells, and in electrochemical cells comprising the paper.

The present invention will be elucidated by the following examples, without being limited thereto or thereby.

EXAMPLE 1

An aramid paper was manufactured from para-aramid fibrils and para-aramid fibers.

The para-aramid fibrils had a Canadian Standard Freeness of 120 ml, a specific surface area after drying of 0.86 m2/g and a weight weighted length for particles having a length>250 micron of 0.93 mm. The fibrils were manufactured as described in WO2005/059211, with a further shear step being carried out before incorporating them into the paper.

The para-aramid fibers were para-aramid shortcut with a length of 6 mm and a linear density of 1.1 dtex. The paper contained 70 wt. % para-aramid fibrils and 30 wt. % para-aramid fiber.

The paper had the following properties:
Grammage: 18 g/m2
Thickness: 30 micron
Density: 0.6 g/cc (calculated from grammage and thickness)
Porosity: 60% (calculated from grammage and thickness)
Gurley: 3 seconds
Tensile strength: 5 N/cm
Average pore size: 6 micron The paper was subjected to cycle testing in an electrochemical cell in accordance with the procedure described below. Celgard 2325 (standard commercially available polyolefin material) was also tested.

Separator papers were tested in pouch cells with a maximum capacity of 80 mAh.

Commercial NMC cathode and a graphite anode were used. Electrolyte used was 1M LiPF6 in EC:EMC (3:7% wt), 2% wt VC was used as additive.

The results are given in Table 1, and in FIG. 1.

TABLE 1

| | Capacity retention | | | |
|---|---|---|---|---|
| | after 200 cycles | after 300 cycles | after 500 cycles | after 900 cycles |
| Celgard | 93% | 91% | 87% | 80% |
| Aramid separator | 97% | 97% | 99% | 97% |

As can be seen from the table and the FIGURE, the paper according to the invention shows a much higher capacity retention than the commercially available product. After 900 cycles cells containing Celgard separator have reached the end of life (80% capacity) whilst cells containing aramid separator still show 97% capacity retention. This means that an electrochemical cell comprising the paper according to the invention will have a longer lifetime than an electrochemical cell comprising the comparative product.

EXAMPLE 2

To show the effect of the present invention, comparative papers were manufactured with equivalent compositions, grammage (19 g/m2), thickness (30 microns), and density (0.6 g/cc) as the paper according to the invention, but wherein fibrils with different properties were used. All papers were manufactured on a Rapid Koethe (RK) handsheet former according to the method of ISO 5269-2.

The composition and properties of the papers are given in Table 2.

TABLE 2

| | Recipe | | | |
|---|---|---|---|---|
| | % Fibrils | % Highly refined pulp | % Refined pulp | Fibers |
| Invention | 70 | | | 30 |
| CE1 | | 70 | | 30 |
| CE2 | | | 70 | 30 |

In the paper according to the invention para-aramid fibrils were used with a specific surface area after drying of 0.42 m2/g, a Canadian Standard Freeness of 50 ml, and a weight weighted length for particles having a length>250 micron of 0.70 mm. This material was obtained by jet-spinning polymer solution as described in WO2005/059211, followed by a further shear process step.

In comparative example 1 highly refined para-aramid pulp was used, with a specific surface area after drying of 14 m2/g, a Canadian Standard Freeness of 90 ml, and a weight weighted length for particles having a length>250 micron of 0.84 mm. This pulp was obtained by subjecting fibers to a number of high shear refining steps.

In comparative example 2 commercial Twaron 1094 paraaramid pulp was used, with a specific surface area after drying of 13 m2/g, a Canadian Standard Freeness of 170 ml, and a weight weighted length for particles having a length>250 micron of 1.46 mm. This pulp was obtained by subjecting fibers to a number of high shear refining steps.

The para-aramid fibers were para-aramid shortcut with a length of 6 mm and a linear density of 1.1 dtex.

To simulate conditions of use, the papers were kept for 20 hours in demineralised water, wherein the water is a model for the electrolyte in the cell. The tensile strength of the papers after this aging step was determined on the wet papers, and compared with the original strength of the papers. The results are given in Table 3.

TABLE 3

| | TS dry N/cm | TS after wet aging N/cm | Tensile strength retention after wet aging |
|---|---|---|---|
| Invention | 3.98 | 2.17 | 54% |
| CE1 | 1.02 | 0.22 | 21% |
| CE2 | 1.33 | 0.15 | 12% |

Tensile strength (TS) was determined in accordance with ISO 1924-2.

As can be seen from Table 3, the paper according to the invention shows a tensile strength retention after wet aging which is much higher than the tensile strength retention of the comparative papers. This means that the paper according to the invention will show less degradation during use, leading to an electrochemical cell with a longer lifetime. Additionally, the absolute value of the strength after aging of the paper according to the invention is also higher than the strength after aging of the comparative papers, which is an additional advantage. The same goes for the dry strength.

The invention claimed is:

1. A paper for a separator in an electrochemical cell, comprising:
   at least 60 wt. % of an aramid fibril; and
   at least 1 wt. % of an aramid fiber, wherein:
   the paper has a grammage of 5 to 100 g/m$^2$;
   the aramid fibril has a Canadian Standard Freeness (CSF) in a wet phase of less than 300 ml and a specific surface area (SSA) after drying of 0.1 to 3 m$^2$/g; and
   the aramid fibril is not obtained by fibrillating fibers to form a pulp.

2. The paper according to claim 1, wherein the paper comprises at most 90 wt. % of the aramid fibril.

3. The paper according to claim 1, wherein the CSF of the aramid fibril in the wet phase is less than 200 ml.

4. The paper according to claim 1, wherein the aramid fibril has a weight weighted length for particles having a length above 250 micron (WL0.25) of less than 1.2 mm.

5. The paper according to claim 1, wherein the paper comprises at least 5 wt. % and at most 38 wt. % of the aramid fiber.

6. The paper according to claim 1, wherein the aramid fiber has a number-average length in the range of 2-15 mm.

7. The paper according to claim 1, wherein the paper comprises at least 70 wt. % of meta-para aramid and para-aramid relative to a total weight of the paper.

8. The paper according to claim 1, wherein the grammage of the paper is 5-50 g/m$^2$.

9. A method for manufacturing a paper according to claim 1, comprising:
   preparing a suspension comprising the aramid fibril, the aramid fiber, and optional further components;
   applying the suspension onto a porous screen so as to lay down a mat of randomly interwoven material onto the screen;
   removing water from the mat;
   drying the mat to form a paper; and
   optionally subjecting the paper to a calendaring step.

10. The method according to claim 9, further comprising manufacturing the aramid fibril by a process comprising:
  polymerizing an aromatic diamine and an aromatic dicarboxylic acid halide to produce an aramid polymer, in a mixture of N-methylpyrrolidone or dimethylacetamide and calcium chloride or lithium chloride, to obtain a dope wherein the polymer is dissolved in the mixture and the polymer concentration is 2 to 6 wt. %;
  converting the dope to fibrils by using a jet spin nozzle under a gas stream;
  coagulating the fibrils using a coagulation jet; and
  optionally subjecting the fibrils to shear forces.

11. An electrochemical cell, comprising a cathode, an anode, and an electrolyte between the cathode and the anode, wherein the cathode and the anode are separated by the separator paper according to claim 1.

12. The electrochemical cell according to claim 11, wherein the electrochemical cell is a lithium ion battery, and the electrolyte comprises lithium ions.

13. The lithium ion battery according to claim 12, wherein the anode comprises carbon, the cathode comprises a metal oxide or metal phosphate, and the electrolyte comprises a lithium complex in an organic solvent.

14. The paper according to claim 1, wherein the aramid fibril is a para-aramid fibril.

15. The paper according to claim 1, wherein the aramid fiber is a meta-para-aramid or para-aramid fiber.

16. The paper according to claim 1, wherein the SSA after drying of the aramid fibril is less than 1.5 $m^2/g$.

17. The paper according to claim 1, wherein the aramid fiber has a linear density of less than 1.6 dtex.

18. The paper according to claim 1, wherein the paper comprises at least 60 wt. % of para-aramid relative to a total weight of the paper.

19. The paper according to claim 1, wherein the aramid fiber is non-fibrillated aramid fiber.

* * * * *